(12) United States Patent
Chalmandrier-Perna (10) Patent No.: US 11,328,060 B2
(45) Date of Patent: *May 10, 2022

(54) MULTI-TIERED SANDBOX BASED NETWORK THREAT DETECTION

(71) Applicant: Fortinet, Inc., Sunnyvale, CA (US)

(72) Inventor: Michael F. Chalmandrier-Perna, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/730,892

(22) Filed: Dec. 30, 2019

(65) Prior Publication Data
US 2020/0134177 A1    Apr. 30, 2020

Related U.S. Application Data

(63) Continuation of application No. 15/448,476, filed on Mar. 2, 2017, now Pat. No. 10,534,909.

(51) Int. Cl.
*G06F 21/55*    (2013.01)
*G06F 21/53*    (2013.01)
(Continued)

(52) U.S. Cl.
CPC ........ *G06F 21/554* (2013.01); *G06F 9/45558* (2013.01); *G06F 21/53* (2013.01);
(Continued)

(58) Field of Classification Search
CPC .... G06F 21/554; G06F 21/53; G06F 9/45558; G06F 2009/45587; G06F 2009/45591; G06F 2221/034
See application file for complete search history.

(56) References Cited

U.S. PATENT DOCUMENTS

2008/0133616 A1* 6/2008 Willoughby ........ G06F 11/3672
2010/0132013 A1  5/2010 van Riel et al.
(Continued)

OTHER PUBLICATIONS

Non-Final Office Action for U.S. Appl. No. 15/448,476, dated Oct. 22, 2018, 17 pages.
(Continued)

*Primary Examiner* — Ashokkumar B Patel
*Assistant Examiner* — William B Jones
(74) *Attorney, Agent, or Firm* — Law Office of Dorian Cartwright; Dorian Cartwright (57) ABSTRACT

Systems and methods for multi-tiered sandbox based network threat detection are provided. According to one embodiment, a file is received by a virtual sandbox appliance. The file is caused to exhibit a first set of behaviors by running the file within a virtualization application based environment of the virtual sandbox appliance. The virtualization application based environment acts as an intermediary between executable code, an operating system (OS) application programming interface (API), and an instruction set of a particular computer architecture. The file is further caused to exhibit a second set of behaviors by running the file within a container based environment of the virtual sandbox appliance. Differences, if any, between the first set of behaviors and the second set of behaviors are determined. Finally, the file is classified as malicious when the differences are greater than a predefined or configurable threshold.

8 Claims, 10 Drawing Sheets

(51) Int. Cl.
   *G06F 9/455*     (2018.01)
   *G06F 21/56*     (2013.01)
(52) U.S. Cl.
   CPC .. *G06F 21/566* (2013.01); *G06F 2009/45587* (2013.01); *G06F 2221/034* (2013.01)

(56) References Cited

U.S. PATENT DOCUMENTS

| | | | |
|---|---|---|---|
| 2017/0041189 A1* | 2/2017 | Aswathanarayana ... | H04L 67/34 |
| 2017/0041338 A1* | 2/2017 | Martini ............... | H04L 63/1441 |
| 2018/0025157 A1* | 1/2018 | Titonis ................ | H04W 12/128 |
| | | | 726/22 |
| 2018/0039779 A1* | 2/2018 | Li ......................... | G06F 21/566 |
| 2018/0165177 A1* | 6/2018 | Gupta ................. | G06F 11/3648 |
| 2018/0253551 A1* | 9/2018 | Chalmandrier-Perna .................... | |
| | | | G06F 21/53 |

OTHER PUBLICATIONS

Final Office Action for U.S. Appl. No. 15/448,476, dated May 23, 2019, 24 pages.
Notice of Allowability for or U.S. Appl. No. 15/448,476, dated Sep. 26, 2019, 17 pages.

* cited by examiner

MULTI-TIERED SANDBOX BASED NETWORK THREAT DETECTION

CROSS-REFERENCE TO RELATED PATENTS

This application is a continuation of U.S. patent application Ser. No. 15/448,476, filed on Mar. 2, 2017, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017-2019, Fortinet, Inc.

BACKGROUND

Field

Embodiments of the present invention generally relate to network threat detection. In particular, embodiments of the present invention relate to multi-tiered sandbox based network threat detection.

Description of the Related Art

A typical computer network contains multiple computing devices e.g., computer servers that require various network security mechanisms in order to execute in a desired manner. Network security devices (e.g., firewalls) are utilized to implement security policies in the network and safeguard the computing devices from a variety of network attacks/threats. A firewall acts as a filter between a trusted network (e.g., a private enterprise network) and an untrusted network (e.g., external networks, such as the Internet) in a manner such that incoming and outgoing data packets are monitored and undesired/malicious data packets are filtered out. With advancement in network security technology, network security devices are incorporated into trusted platforms to inspect and catch obfuscated attacks/advanced threats. Attackers may operate through a chain of networks and deploy advanced threats, which may make use of encryption, compression and/or apply an array of other mechanisms to bypass detection by typical signature-based analysis.

Although existing threat-filtering implementations e.g., firewalls, content pattern recognition language (CPRL) based filters, or other threat detection platform(s) (TDP) apply pre-filtering on incoming data packets, they fail to share pre-filtered information among each other, resulting in lost efficiency and other issues. For example, as the applications are not tagged when processed by a firewall, a downstream TDP must again perform pre-filtering. Although TDPs scrutinize the applications critically, if any portion of data packet(s) pertaining to the applications is strongly encrypted or obfuscated through a variety of mechanisms employed by advanced threats e.g., bit stuffing, TDPs may fail to identify a malicious attack.

There is therefore a need in the art for systems and methods that allow advanced filtering by processing application-tagged and/or threat-level tagged files and/or more efficient utilization of virtualized security sandbox resources.

SUMMARY

Systems and methods are described for multi-tiered sandbox based network threat detection are provided. According to one embodiment, a file is received by a virtual sandbox appliance. The file is caused to exhibit a first set of behaviors by running the file within a virtualization application based environment of the virtual sandbox appliance. The virtualization application based environment acts as an intermediary between executable code, an operating system (OS) application programming interface (API), and an instruction set of a particular computer architecture. The file is further caused to exhibit a second set of behaviors by running the file within a container based environment of the virtual sandbox appliance. Differences, if any, between the first set of behaviors and the second set of behaviors are determined. Finally, the file is classified as malicious when the differences are greater than a predefined or configurable threshold.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for multi-tiered sandbox based network threat detection. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Embodiments of the present invention generally relate to network threat detection. In particular, embodiments of the present invention relate to multi-tiered sandbox based network threat detection.

In an aspect, the present disclosure relates to a method of network threat detection involving receiving, at a computer system, a file; processing, at the computer system, the file using a virtualization application based environment to output a first behavior, wherein the virtualization application based environment is created based on an application to which the file pertains; processing, at the computer system, the file using a container based environment to output a second behavior; and identifying/determining/computing/evaluating the difference between the first behavior and the second behavior to confirm whether the file is malicious, wherein the file is confirmed as being malicious when the difference between the first behavior and the second behavior is greater than a defined threshold.

In an aspect, if the difference between the first behavior and the second behavior is not greater than a defined threshold, the method can further include the step of processing, at the computer system, the file using a full hypervisor based environment so as to output a third behavior, wherein differences between the first behavior, the second behavior, and the third behavior can be evaluated to confirm whether the file is malicious. For instance, if the behavior of the file within the various environments differs by greater than or equal to a predefined or configurable threshold, it can be determined that the file is malicious or has undesired content.

In an aspect, the difference between the first behavior and the second behavior can be referred to as a first delta, the difference between the second behavior and the third behavior can be referred to as a second delta, and the difference between the first behavior and the third behavior can be referred to as a third delta, wherein any or all of the first delta, the second delta, and the third delta can be evaluated to confirm whether the file is malicious or contains a threat.

In an aspect, processing of the file using the virtualization application based environment and using the container based environment can be performed in parallel, wherein the first behavior and the second behavior can be given as an input to the hypervisor based environment.

In an aspect, the hypervisor based environment can require a higher level of entropy generation for environment creation when compared with the container based environment, and the container based environment can require a higher level of entropy generation for environment creation when compared with the virtualization application based environment. In another aspect, the hypervisor based environment can require a greater amount of computer system resources when compared with the container based environment, and the container based environment can require a greater amount of computer system resources when compared with the virtualization application based environment.

In an aspect, the file can be tagged using a pre-filter based on an application by which it would be executed. The file can also be tagged using a pre-filter based on a threat-level that is associated with the file by the pre-filter (or filtering engine). In another aspect, the file can be pre-filtered using a network security device (e.g., a firewall, a network security gateway, an Intrusion Prevention System (IPS), an Intrusion Detection System (IDS) or a Unified Threat Management (UTM) appliance) before being received at the computer system.

The file can further be queued before being processed at the computer system such that the queuing, in an exemplary implementation, can enable separation of the file from its corresponding network security threat data.

In an aspect, the virtualization application based environment and the container based environment can use a pointer system through a change root environment instead of a full operating system.

In an aspect, a system for threat detection is provided, wherein the system includes a non-transitory storage device having embodied therein one or more routines operable to determine if a file is malicious; and one or more processors coupled to the non-transitory storage device and operable to execute the one or more routines, wherein the one or more routines include: a file receive module, which when executed by the one or more processors, receives a file, a virtualization application environment based file processing module, which when executed by the one or more processors, processes the file to output a first behavior, wherein the virtualization application based environment is created based on application to which the file pertains; a container environment based file processing module, which when executed by the one or more processors, processes the file to output a second behavior; a delta computation based file classification module, which when executed by the one or more processors, identifies difference between the first behavior and the second behavior to confirm whether the file is malicious, wherein the file is classified as being malicious when the difference between the first behavior and the second behavior is greater than a predefined or configurable threshold.

In an aspect, the present disclosure further relates to a method of network threat detection that includes the steps of receiving, at a network security device, a file; pre-filtering, at the network security device, the file so as to associate a first tag with the file based on an application to which the file pertains, and associate a second tag with the file based on threat-level that the file poses based on analysis of the file by the network security device; and transmitting, at the network security device, to a computer system, the tagged file, wherein the computer system processes the file using a virtualization application based environment to output a first behavior and processes the file using a container based environment to output a second behavior so as to identify difference between the first behavior and the second behavior to confirm whether the file is malicious, wherein the file is confirmed as being malicious when the difference between the first behavior and the second behavior is greater than a predefined or configurable threshold.

In an aspect, a method of network threat detection includes the steps of receiving, at a computer system, a file; queuing, at the computer system, the received file; and processing, at the computer system, in parallel, the queued file at a virtualization application based environment to output a first behavior, and at a container based environment to output a second behavior; and identifying difference between the first behavior and the second behavior to confirm whether the file is malicious, wherein the file is confirmed as being malicious when the difference between the first behavior and the second behavior is greater than a defined threshold.

Figure 1A:
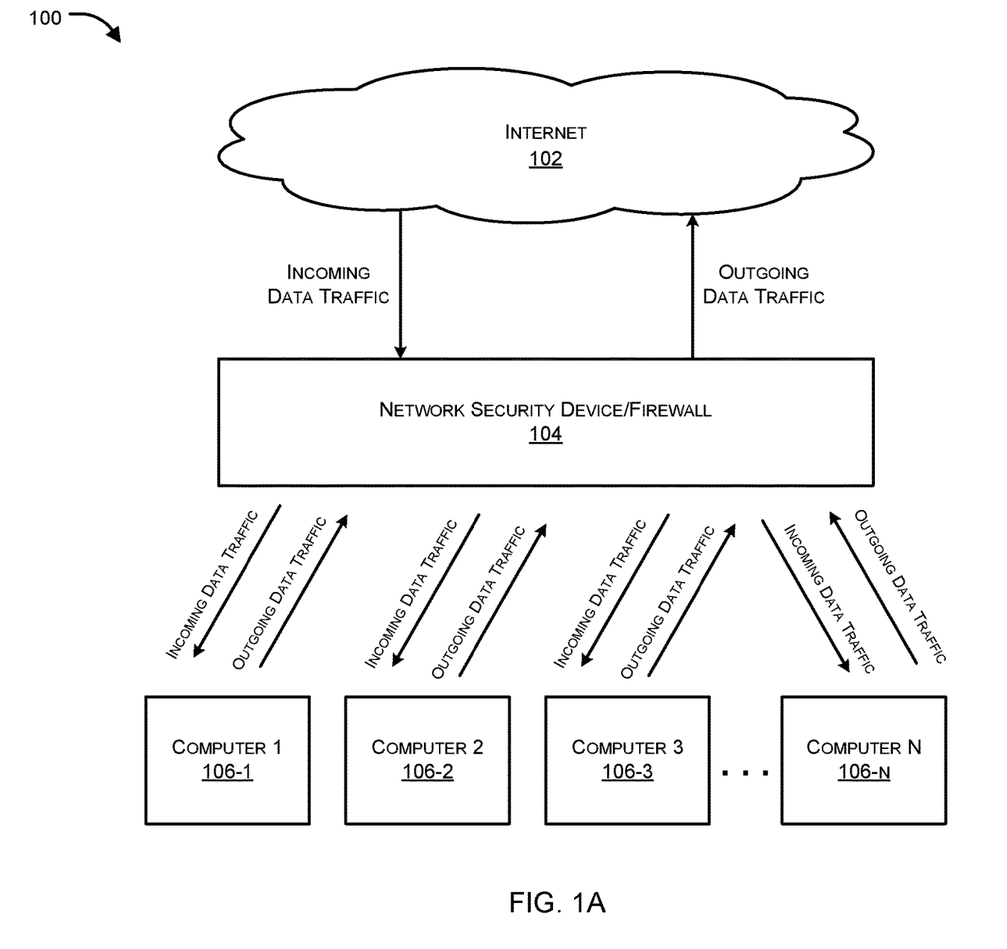
FIG. 1A illustrates an exemplary network architecture in which or with which embodiments of the present invention can be implemented.

FIG. 1A illustrates an exemplary network architecture 100 in which or with which embodiments of the present invention can be implemented. Such an exemplary network/system architecture 100 can include a network security device (NSD) 104 that can process incoming packets from Internet 102 or from a network that it protects (which may be referred to as the protected network or the private network hereinafter) and filters the packets based on one or more security parameters, including, but not limited to, the type of packet, the length/size of the packet, frequency of the packet, a destination Internet Protocol (IP) address, a source IP address, a source/destination port, among other like parameters. In an aspect, NSD 104 can include, but is not limited to, a firewall, an anti-virus scanning device, a content filtering device, an intrusion detection device (IDS), an intrusion prevention device (IPS), and a gateway device, among other like devices. Protected network can be operatively coupled with NSD 104, and can include one or more computing devices such as computer 1 106-1, computer 2 106-2, computer 3 106-3, . . . , and computer N 106-N (which may be collectively referred to as computer(s) 106 or computing device(s) 106), which can send packets to or receive packets from Internet 102.

Those skilled in the art will appreciated the term "packet" is being used herein as an abstraction for data transferred between two or more computing devices via a network or networks and may also be referred to as network traffic, file, segment, chunk, or any other like. Similarly, those skilled in the art will appreciate that computing devices 106 can include a variety of types of computing devices, including, but not limited to mobile phones, smartphones, laptops, tablet computers, Personal Computers (PCs), personal digital assistants (PDAs), among other like devices.

Those skilled in the art will further appreciate that along with protecting an enterprise network that includes computing devices 106, NSD 104 can perform a variety of other functions. For instance, NSD 104 can electrically and functionally isolate modem (not shown) from computing devices 106. NSD 104 functionality can be performed either in software or in hardware, wherein software NSD 104 implementations can effectively perform functional isolation but electrical isolation can generally only be achieved by using a hardware firewall. Another function performed by NSD 104 may include network address translation (NAT), which hides the internal addresses of computing devices 106 that form part of the protected network, making it difficult for attackers to directly target a particular computing device 10 with computer viruses and other malicious software (malware). As mentioned above, another function of NSD 104 is packet filtering, wherein packets entering the NSD 104 using open ports are screened for the presence of malicious content, for example. Yet another function of NSD 104 is to detect port scans by computers on the Internet, and to "stealth" unused ports, thereby further reducing access by attackers to the protected computers.

In an aspect, the phrase "security device" generally refers to a hardware device or appliance configured to be coupled to a network and to provide one or more of data privacy, protection, encryption and security. NSD 104 therefore can be a device providing one or more of the following features: network firewalling, virtual private networking (VPN), anti-virus, intrusion prevention (IPS), content filtering, data leak prevention, antispam, antispyware, logging, reputation-based protections, event correlation, network access control, vulnerability management, load balancing and traffic shaping—that can be deployed individually in the form of point solutions or in various combinations in the form of a UTM solution. Non-limiting examples of network security devices include proxy servers, firewalls, VPN appliances, gateways, UTM appliances and the like.

Figure 1B:
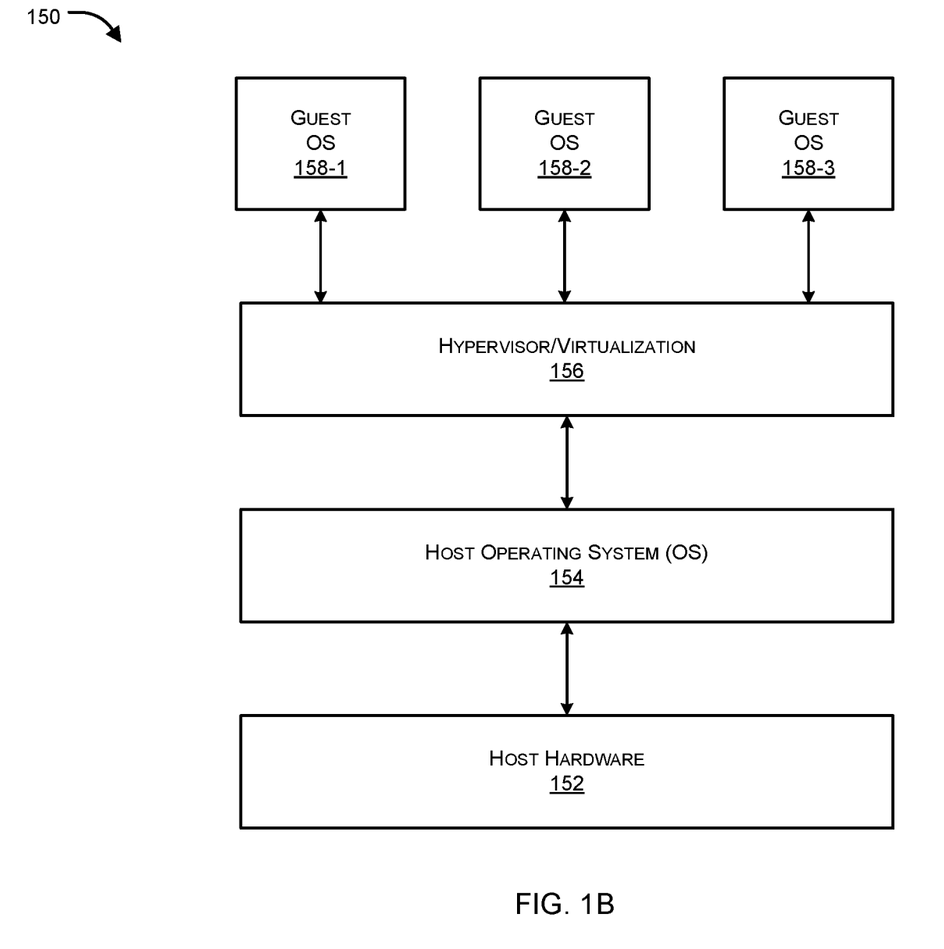
FIG. 1B illustrates an exemplary virtualization in which or with which embodiments of the present invention can be implemented.

FIG. 1B illustrates an exemplary virtualization architecture 150 in which or with which embodiments of the present invention can be implemented. As shown, architecture 150 can include a hypervisor 156 (which may also be referred to as a virtual machine monitor or a virtual machine manager (VMM)) that can run one or more guest operating systems (OSs), such as OS 158-1, OS 158-2, and OS 158-3 (which may be collectively referred to as guest OS(s) 158) on host hardware 152. In an exemplary implementation, hypervisor 156, which can be a software or a hardware or a firmware, or a combination thereof, can abstract/isolate guest OS 158 from both the underlying host hardware 152 and host OS 154, which enables the host hardware 152 to independently operate each guest OS 158 as a virtual machine (VM) and allows each VM to effectively utilize computing resources, e.g., processor cycles, memory space, network bandwidth, operating system, of host hardware 152.

In an exemplary implementation, hypervisor 156 can enable a host computer system to run multiple guest VMs to improve utilization of underlying host hardware 152 and host OS 154. Hypervisor 156 may, among other things, monitor physical memory usage of guest OSs 158, and adjust memory usage and scheduling when necessary. Also guest OSs 158 may be migrated to balance physical memory usage across multiple systems. Hypervisor 156 therefore presents guest OSs with a virtual operating platform and manages execution of guest OSs 158. In this manner, multiple instances of a variety of OSs (e.g., Linux, Windows, and OS X instances) may share the virtualized hardware resources of and concurrently run on a single physical server. This contrasts with operating-system-level virtualization, where all instances (usually called containers) must share a single OS kernel though the guest OS(s) can differ in user space, such as different Linux distributions with the same kernel. Non-limiting examples of hypervisor 156 include, VMWARE, ORACLE VM, ESX SERVER, LYNXSECURE, TRANGO, IBM POWER, and/or any other suitable hypervisor or virtualization software.

Host hardware 152 may represent various combinations of hardware resources, including, but not limited to microprocessors, memory, storage devices and network interface cards.

Guest OS 158, on the other hand, generally represents any OS running within a virtualized environment, such as a virtual machine (VM). Non-limiting examples of guest OS 158 include, MICROSOFT WINDOWS, UNIX, LINUX, and/or any other suitable operating system. Similarly, a VM may represent any virtualized environment in which a guest OS may run separately from a host OS.

In an exemplary scenario involving a virtual security appliance, host OS 154 can be used for managing host hardware 152 and providing common services for programs running on host OS 154, such as sandbox queuing and entropy engine services. In other embodiments, host OS 154 may manage basic hardware of the virtual security appliance, such as processor, memory and the like and various layers of parallel threat detection processing (e.g., within a full hypervisor based environment, a container based environment and/or a virtual application based environment) may be managed by guest OS 158.

Figure 2:
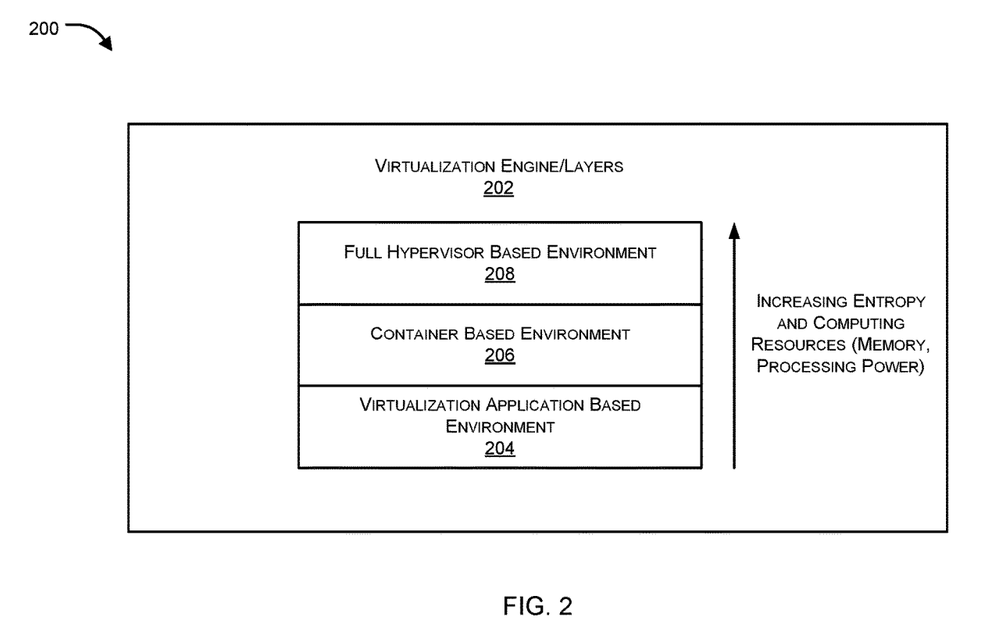
FIG. 2 illustrates a multi-tiered virtualization engine in accordance with an embodiment of the present invention.

FIG. 2 illustrates a multi-tiered virtualization engine 200 in accordance with an embodiment of the present invention. As illustrated, virtualization engine 200 can be represented through multi-tiered virtualization layers 202 that can include a virtualization application based environment 204, a container based environment 206, and a full hypervisor based environment 208. In an aspect, virtualization application based environment 204 represents an environment that requires the least computing resources (e.g., CPU, memory, processing time etc.) of virtualization layers 202, container based environment 206 represents an environment that requires more computing resources than virtualization application based environment 204 but fewer than full hypervisor based environment 208, which represents the most resource intensive virtualization layer 202.

In an exemplary aspect, virtualization application based environment 204 also requires the least entropy for variables and file stores, wherein entropy is a mechanism that provides random data, from a hardware entropy module, for example, in an attempt to create an environment conducive to threat detonation. As explained above, virtualization is the simulation of the hardware upon which other software runs. This simulated hardware environment is called a virtual machine (VM). A classic form of virtualization, known as operating system virtualization, provides the ability to provide multiple instances of an OS on the same physical computer under the direction of a special layer of software called a hypervisor. There are several forms of virtualization, distinguished primarily by the hypervisor architecture. During execution, each such virtual instance (or guest) OS believes that it is running on real hardware with full access to the memory address space but in reality it is operating in a separate VM that maps this memory address space into segment of memory address space of the physical computer. This operation is called address translation. Guest OS can be an unmodified (so-called heavy-weight virtualization) or specifically recompiled for the hypervisor application programming interface (API) (para-virtualization). In lightweight virtualization a single OS instance presents itself as multiple personalities (called jails or zones), allowing high level of isolation of applications from each other at a very low overhead. Application virtualization, which is used by virtualization application based environment 204, provides a virtual instruction set and virtual implementation of the API that a running application expects to use, allowing writing of compilers that compile into this virtual instruction set. Along with synergy, it can permit applications developed for one platform to run on another without modifying the application itself. The Java Virtual Machine (JVM) and, in more limited way, Microsoft.Net are two prominent examples of this type of virtualization. This type of virtualized environment acts as an intermediary between the application code, the operating system (OS) API, and the instruction set of the underlying computer architecture. In an aspect, virtualization application based environment 204 uses a pointer system instead of using a full operating system, thereby allowing each of multiple virtualized environments to perform their functions in a "change root" environment, allowing the computer to simply "reuse" major system files, and allowing usage of smaller amounts of "new data" for the environment (sometimes created by an entropy engine).

Container based environment 206, on the other hand, requires more entropy than virtualization application based environment 204, and therefore is more complex than environment 204. In one embodiment, containers are run on the host OS instead of running a separate guest OS on top of the host OS, and therefore hypervisors are not used in container virtualization. Containers, unlike fully virtualized systems like Parallels Server, VMWare ESX, Xen and Hyper-V share a common kernel and run as "personalities" or "virtual environments" of the same OS. For instance, Linux can be split up into multiple flavors of Linux™ (Redhat host running Ubuntu, Red Hat and SuSE guests) and Windows™ can run the same version of itself in isolated instances with their own unique applications and settings. Benefit of such an approach is the ability to run separate instances of I/O intensive applications such as databases without the overhead associated with full virtualization. As those skilled in the art will appreciate, container based environment 206 may also use a pointer system instead of using a full operating system. In an aspect, environment 206 enables OS kernel level abstraction, enables sharing of the same kernel, and further enables easy resource management.

Full hypervisor based environment 208 requires maximum entropy, and encapsulates all components of a guest OS including its applications and the virtual resources they use, into a single logical entity. Environment 208 therefore uses the full operating system and has highest complexity of the three environments. Environment 208 implements hardware level abstraction, runs separate kernel copies, and enables full hardware emulation within VMs.

In an exemplary implementation, as environment 204 has the least complexity (of the three configured environments), when a file is run in environment 204, there is less for it to check for in terms of parameters/values/behavior that vary with time. On the other hand, as environment 208 has the highest complexity (of the three environments), an incoming file is evaluated/checked on more parameters/values/behavior, making it more difficult for the file to obfuscate attributes that may make it malicious.

In an aspect, full hypervisor based environment entropy can be different from container based environment entropy, wherein the differences can be in terms of parameters such as operating system type, patch level settings, system file sizes, system registry settings, keychain differences, among others.

Figure 3:
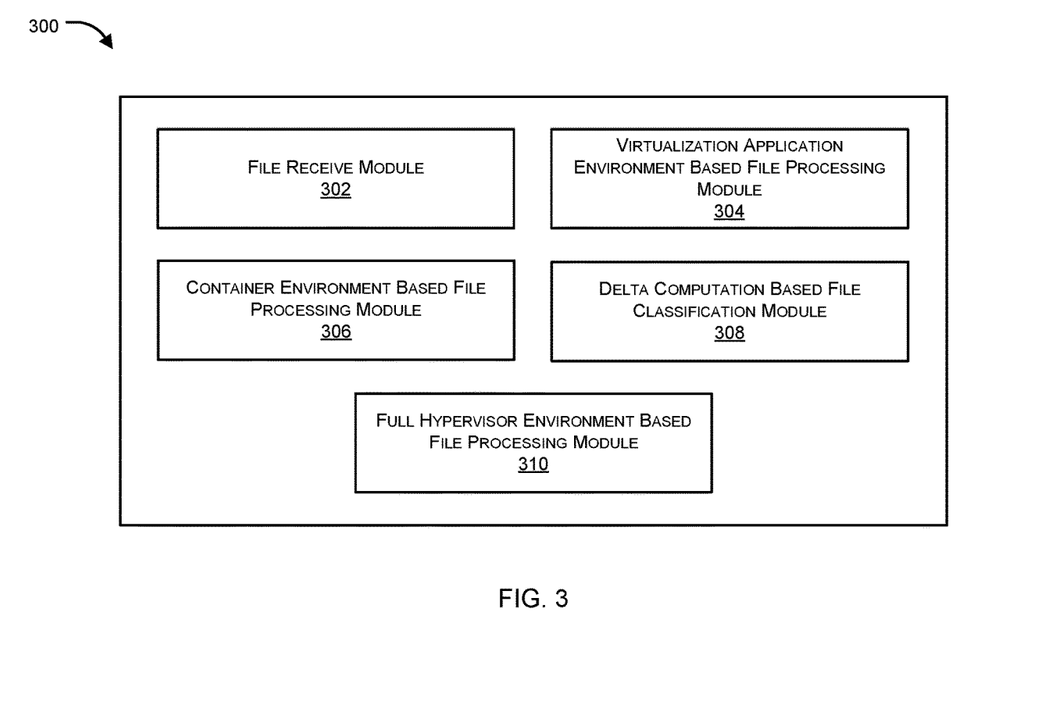
FIG. 3 illustrates an exemplary module diagram for a multi-tiered sandbox based threat detection system in accordance with an embodiment of the present invention.

FIG. 3 illustrates an exemplary module diagram for multi-tiered sandbox based threat detection system 300 in accordance with an embodiment of the present invention. In an exemplary aspect, system 300 can include a file receive module 302 that can be configured to receive a file by a computer system (e.g., a server performing sandboxing) on which virtualization engine (202 of FIG. 2) is implemented. System 300 can further include a virtualization application environment based file processing module 304 that can be configured to process the received file in the virtualization application based environment 204 and output information indicative of a first behavior analysis, and a container environment based file processing module 306 that can be configured to process the received file in the container based environment 206 and output information indicative of a second behavior analysis. System 300 can further include a delta computation based file classification module 308 that can be configured to compute a delta/difference between the first behavior analysis and the second behavior analysis and classify the file based on the computed delta, say as to whether the file is malicious or not. In an aspect, system 300 of the present disclosure can further include a full hypervisor environment based file processing module 310 that can be configured to process the received file in the full hypervisor based environment 208 in order to output information regarding a third behavior analysis.

According to one embodiment, file receive module 302 can be configured to receive a file at a computing device that includes the proposed virtualization engine/layers 202. In an aspect, the file received by the computer can be received after having been processed by an NSD or the virtualization engine may itself be configured as part of the NSD. Those skilled in the art will appreciate that the file described herein may be of any type (e.g., a script file, an application file, an executable file), extension, size, or comprise a variety of types of data, and may be received from a server, the cloud, or from a second computing device. It is further to be appreciated that although various embodiments of the present invention are explained with reference to three specific virtualization environments, additional or fewer virtualization environments are expressly contemplated as potential alternative embodiments.

In an exemplary implementation, before transmitting the file to computing device, NSD can process/pre-filter the file and associate an application and/or a threat-level based tag with the file based on outcome of the processing/pre-filtering step. An application tag can be associated, for instance, based on the file extension, which can help determine the software application with which the file may be associated (e.g., a file having the .doc or .docx extension may be tagged as being associated with the Microsoft Word application). A threat-level based tag, on the other hand, can be associated with the file based on assessment of the file with respect to one or more security/threat parameters such as file size, file content, file structure, source IP address, destination IP address, source port, destination port, among other attributes associated with the network traffic or the file itself. In an aspect, such tags can include, but are not limited to, a short alphanumeric string that can be assigned to the file, metadata retrieved from the file, file type, file size, a pre-defined code/class, a graphic representation, and the like. It will be appreciated by those skilled in the art that one or more application tags and/or one or more threat level tags may also be associated with each file based on an evaluation performed by a network device (such as NSD 104) that processes the file prior to the file being submitted for sandbox evaluation. As mentioned above, the file can be tagged using a pre-filter (which may also interchangeably be referred to as a filtering engine) based on an application with which the file is associated (e.g., the application by which the file may be executed/opened/processed). In yet another aspect, the file can be tagged using a pre-filter based on a threat-level associated with the file. In another aspect, the file can be pre-filtered using an NSD before being received at the computer system/computing device.

In an aspect, a data structure, for instance, a threat detection file queue (TDFQ) can be implemented at the computing device to receive one or more tagged files from the NSD. In an aspect, the tagged file can be transmitted from the TDFQ to one or more appropriate the virtualization engine/layers in order to detect/confirm whether the file is malicious based on the extent of differences (and the extent of such differences) in behavior that is observed when the file is processed within the various environments that form part of the virtualization engine/layers.

In an exemplary implementation, virtualization engine can accept files in the same order in which they are received at TDFQ, thereby following a first-in-first-out (FIFO) approach. In another exemplary implementation, TDFQ can be any of a linear queue, a circular queue, a double-ended queue (De-queue), or a priority queue. In an aspect, at or before TDFQ, a received file can be separated from its corresponding network security threat data, and can therefore be processed based on its metadata/header and payload data. In another aspect, one or more files can be processed in a concurrent fashion by the virtualization layers/engine.

According to an aspect, virtualization application environment based file processing module 304 can be configured to receive the tagged file from TDFQ, and process the tagged file (through environment 204) to output a first behavior. In an exemplary aspect, virtualization application based environment can be created based on application to which the received file pertains. In another aspect, first behavior output can be a numerical value or a set of values or even codes that are indicative of behavior that the received file demonstrates while being processed in the virtualization application based environment 204.

According to another aspect, container environment based file processing module 306 can be configured to receive the tagged file from TDFQ and process (through environment 206) the tagged file to output a second behavior. In an aspect, the second behavior output can be a numerical value or a set of values or even codes that are indicative of behavior that the received file demonstrates while being processed in the container based environment 206.

According to an aspect, delta computation based file classification module 308 can be configured to compute delta/difference between the first behavior output (from module 304) and the second behavior output (from module 306), wherein the delta between the first behavior and the second behavior can be computed by a behavioral indexer in order to confirm/classify the file as malicious, wherein the file can be classified as being malicious if, for instance, the difference between the first behavior output and the second behavior output is greater than a defined threshold. That is, the file can be classified as being malicious when the received file exhibits different behavior when executed within environment 204 as compared to the behavior exhibited when run within environment 206 and when the behavioral differences are beyond a defined threshold.

In an exemplary aspect, behavioral indexer can be configured to, for each environment, evaluate and capture information regarding the behavior of the file within the particular environment, including, but not limited to other files attempted to be accessed, read, written to, and executed along with other actions performed by the file, e.g., attempts to access resources within the private network or the external network, and based on such evaluation, determine differences in behavior across the two environments and classify the received file accordingly.

In an exemplary implementation, upon determining the difference between the first behavior output and second behavior output is less than or equal to a predefined or configurable threshold, module 304 and/or module 306 can submit the tagged file to a full hypervisor environment based file processing module 310, wherein module 310 can process (through environment 208) the received tagged file in order to generate a third behavior output. In an aspect, differences between the first behavior, the second behavior, and the third behavior can be evaluated in order to confirm whether the file is malicious. In another aspect, difference between the third behavior and the computed delta can be evaluated such that if the difference is greater than another defined threshold, the file can be classified as malicious by module 308. In another embodiment, difference between the third and the first behavior, or between the third and the second behavior can be evaluated such that if the difference is greater than respective threshold(s), the file can be confirmed as malicious. In an aspect, the difference between the first behavior and the second behavior can be computed as a first delta, the difference between the second behavior and the third behavior can be computed as a second delta, and the difference between the first behavior and the third behavior can be computed as a third delta, and wherein any or all of the first delta, the second delta, and the third delta can be evaluated to confirm whether the file is malicious. In an aspect, when one or more of the first delta, the second delta, and the third delta meet or exceed a threshold, file can be confirmed as malicious. Those skilled in the art will appreciate that sending the file for evaluation to module 310 after delta computation by module 308 is merely representative of one exemplary implementation, and it is expressly contemplated that behavior assessment of the file by module 310 may always be performed irrespective of the differences in behaviors between the first behavior output and the second behavior output, and therefore all such possible embodiments that enable behavior assessment of a received file under different environments and classification of the file based on the difference in behavior outputs are well within the scope of the present disclosure.

In an aspect, upon identifying that the file is malicious, appropriate quarantine and/or notification measures can be implemented so as to safeguard the system from potential threat. Such quarantine measures can include, but are not limited to, execution of an appropriate anti-virus scan on the file, discarding of the file, blocking all subsequent files having the same file extension as that of the received file, deleting/disabling the received file, blocking files from the source IP address from which the file was originally received and other similar actions.

In another aspect, log(s) can be maintained in order to record actions such as delta information computed between different behavior outputs, files processed in any or a combination of the three virtualization layers, files not processed by the full hypervisor layer, sources of determined malicious files, and the like.

Figure 4A:
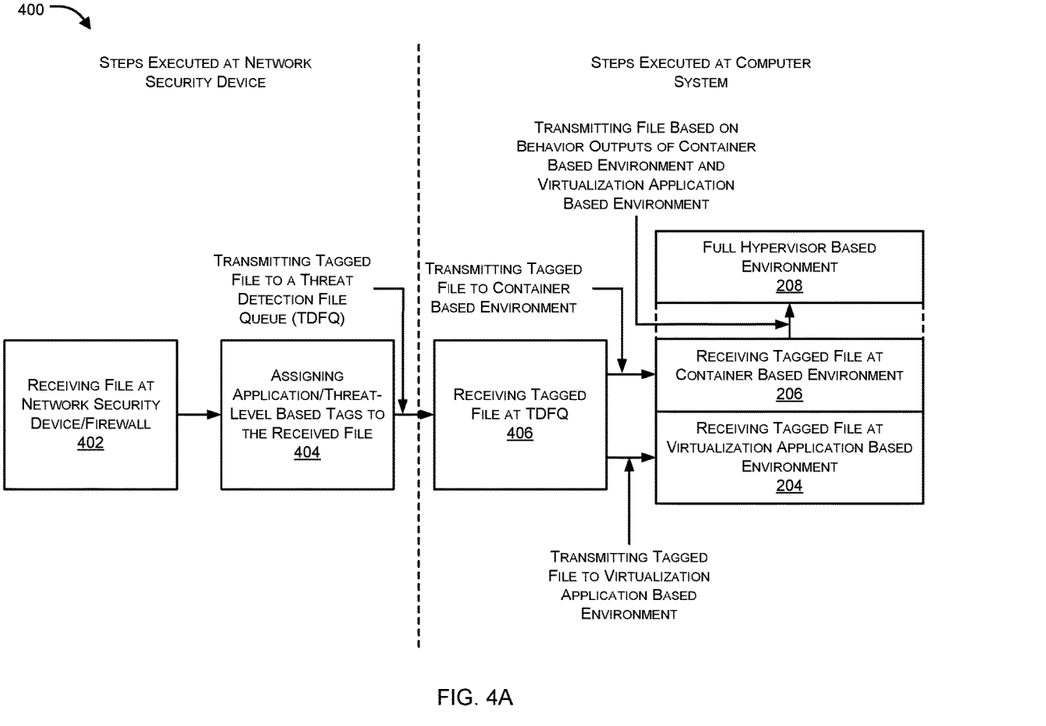
FIG. 4A is a block diagram representing the processing of application/threat-level tagged files by a multi-tiered sandbox having multiple virtualization engines in accordance with an embodiment of the present invention.

FIG. 4A is a block diagram representing the processing of application/threat-level tagged files by a multi-tiered sandbox having multiple virtualization engines in accordance with an embodiment of the present invention.

Block 402 illustrates receiving a file at an NSD, wherein the NSD can receive the file from an external source, for example, the Internet or a cloud server. Block 404 illustrates assignment of one or more application/threat-level tags to the received file. In an aspect, multiple tags can be associated with the single file, wherein such tags can be associated based on the type of the file, the size of file, header information present in the file, metadata associated with the file, source/destination/address/port information associated with the network traffic containing the file, among other like parameters. In an instance, for associating an application based tag with the file, when the file ends in the ".doc" or ".docx" extension, it can be tagged as a Microsoft Word file, and a multimedia file can be tagged as a MPEG file. In an alternate implementation, tags can also be independent from the type of file, for example, when a file is received at the NSD, irrespective of the type of file, the NSD can associate a timestamp with the file in the form of a tag, or associate a potential security threat-level that the file poses, wherein such tagged files can then be transmitted to a TDFQ.

Block 406 illustrates a TDFQ implemented within a computer system (that enables virtualization) can receive one or more tagged files from the NSD. In an aspect, received tagged file can be transmitted from NSD to a virtualization application based environment 204 and to a container based environment 206 for processing, generating a first behavior output and a second behavior output, respectively. Upon determining that the difference between the first behavior output and the second behavior output is less than or equal to a defined threshold (e.g., the file behaved/responded/interacted largely in the same manner in both the environments), the tagged file can be transmitted from environment 204 or from environment 206 to a full hypervisor based environment 208, wherein environment 208 can process the tagged file and generate a third behavior output so as to allow an assessment among the differences between the first, the second, and the third behavior outputs that the file demonstrates in each configured environment, based on which the file can be classified as being malicious, for instance when the difference in behavior/execution/interaction/actions among two of the environments is beyond a defined threshold/limit.

Figure 4B:
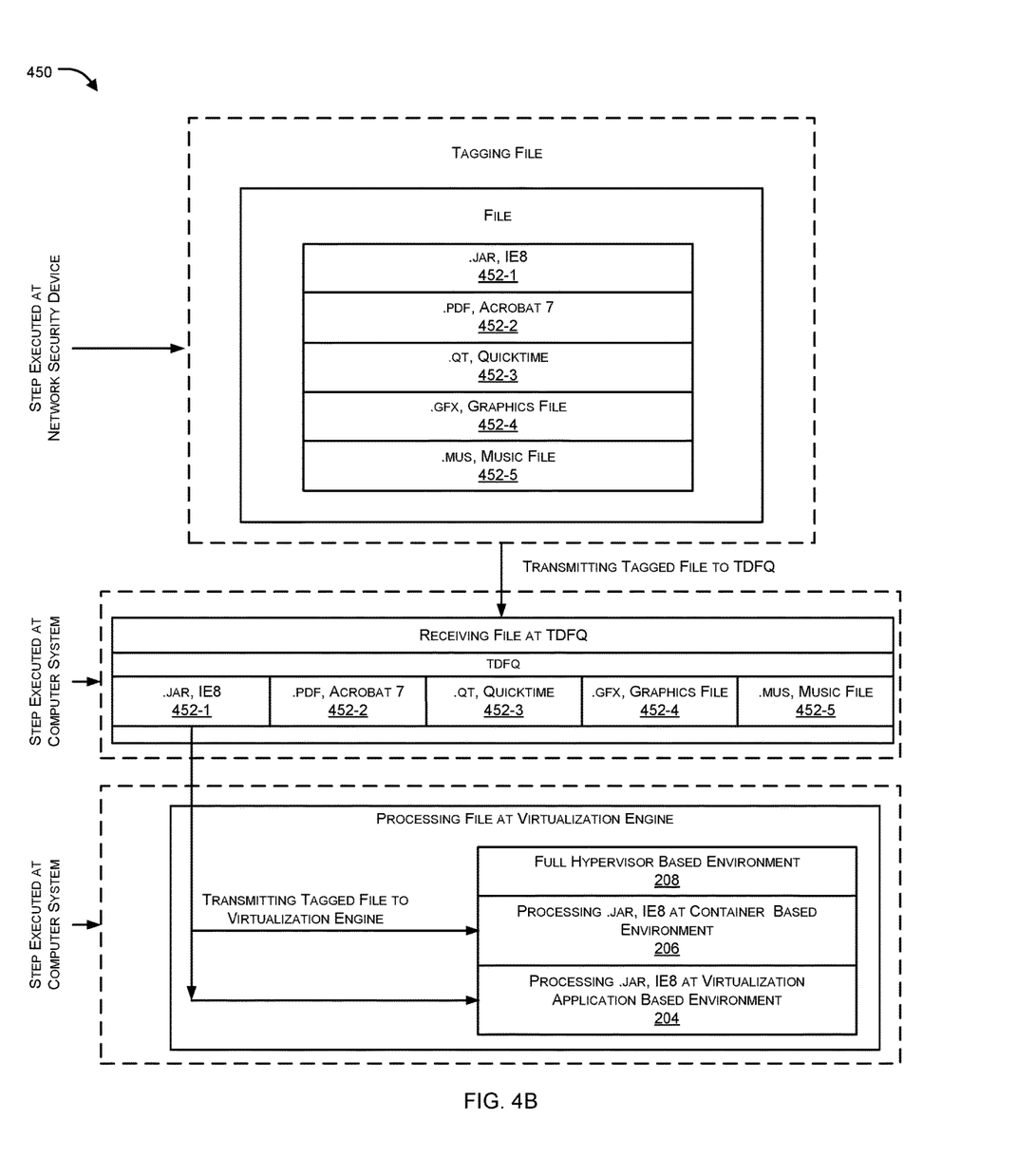
FIG. 4B is a block diagram illustrating processing of application/threat-level tagged files by a multi-tiered sandbox having multiple virtualization engines in accordance with an embodiment of the present invention.

FIG. 4B is a block diagram illustrating processing of application/threat-level tagged files by a multi-tiered sandbox having multiple virtualization engines in accordance with an embodiment of the present invention. In an exemplary implementation, one or more files can be tagged by an NSD, for an instance, .jar file 452-1 can be tagged as being associated with Internet Explorer (IE) 8, .pdf file 452-2 can be tagged as an Acrobat 7 file, .QT file 452-3 can be tagged as being a Quicktime file, .gfx file 452-4 can be tagged as a graphics file, and .mus file 452-5 can be tagged as a music file. As those skilled in the art will appreciate, such files and tags are only exemplary in nature and any other types of files can be recognized and tagged accordingly based on needs of the particular implementation.

In an aspect, the NSD can transmit one or more tagged files 452-1, 452-2, 452-3, 452-4, and 452-5 (which may be collectively referred to as tagged files 452) to a TDFQ, wherein, in response to receiving the tagged files 452 at the TDFQ, the files 452 can be submitted for execution within one or more configured virtualization layers. Such submission of files from the TDFQ to the virtualization layers can be performed in a serial or parallel manner. In an aspect, files can be selected for execution with in the virtualization layers based on various parameters, for an instance, file type, file size, priority associated with files, timestamp and the like.

In an exemplary aspect, .jar file 452-1 tagged as being associated with IE 8 can be received by the virtualization application based environment 204 and container based environment 206 of the virtualization engine, wherein receiving and/or processing of the tagged .jar file 452-1 *by* environment 204 and environment 206 can be performed in parallel or in a serial manner. Processing of the tagged .jar file 452-1 in environment 204 can generate a first behavior output, and processing of the tagged .jar file 452-1 in environment 206 can generate a second behavior output, wherein the delta/difference between the first behavior output and the second behavior output can accordingly be computed and evaluated.

In an embodiment, if the computed delta is greater than a defined threshold, .jar file 452-lean be classified/confirmed as being malicious, which would mean that the file behaved differently within the two environments (e.g., the threat contained within the file was detonated while running within environment 206). In one embodiment, a legitimate file is assumed to behave/interact/execute in the same manner across all environments. In an alternate embodiment, if the computed delta is less than or equal to the defined threshold, .jar file 452-lean be processed by full hypervisor based environment 208 in order to generate a third behavior output. In an aspect, differences between the first behavior, the second behavior, and the third behavior can be evaluated in order to confirm if the .jar file 452-1 is malicious. In a similar fashion, other selected files can be processed so as to confirm if they are malicious.

Figure 5:
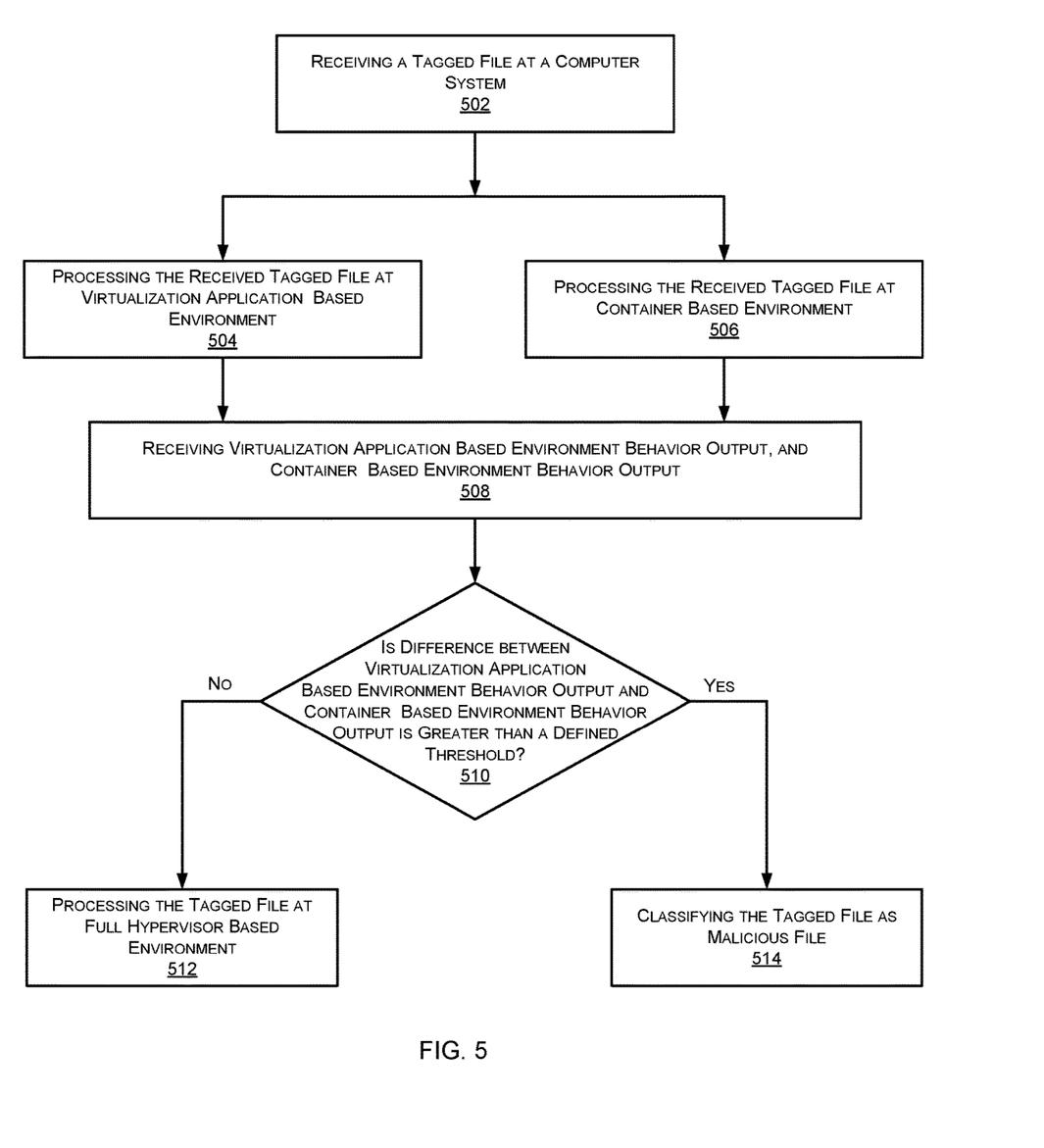
FIG. 5 is a flow diagram illustrating multi-tiered sandbox based network threat detection processing in accordance with an embodiment of the present invention.

FIG. 5 is a flow diagram illustrating multi-tiered sandbox based network threat detection processing in accordance with an embodiment of the present invention. In an aspect, the proposed method can include the steps of, at step (502), receiving a tagged file at a computer system from a NSD, at step (504), processing the received tagged file at virtualization application based environment, at step (506), processing the received tagged file at container based environment, and at step (508), receiving virtualization application based environment behavior output and container based environment behavior output in order to, at step (510), determine whether the difference between the virtualization application based environment behavior output and the container based environment behavior output is greater than a defined threshold such that in case the difference is less than or equal to the threshold, at step (512), the tagged file can be processed at the full hypervisor based environment, and in case difference is greater than the threshold, at step (514), classifying the tagged file as malicious file. It would be appreciated that execution of step (512) for execution of the file at the full hypervisor based environment may not be dependent on the delta computed between the first and second behavior outputs, and may be done in each iteration so as to enable comparison between the first, second, and third behavior outputs for determination of whether the file is malicious. It should further be appreciated that it may be possible to just compare second and third behavior outputs, or only compare first and third behavior outputs, or any other combination, and all such possible embodiments and implementations are therefore well within the scope of the present disclosure.

Figure 6:
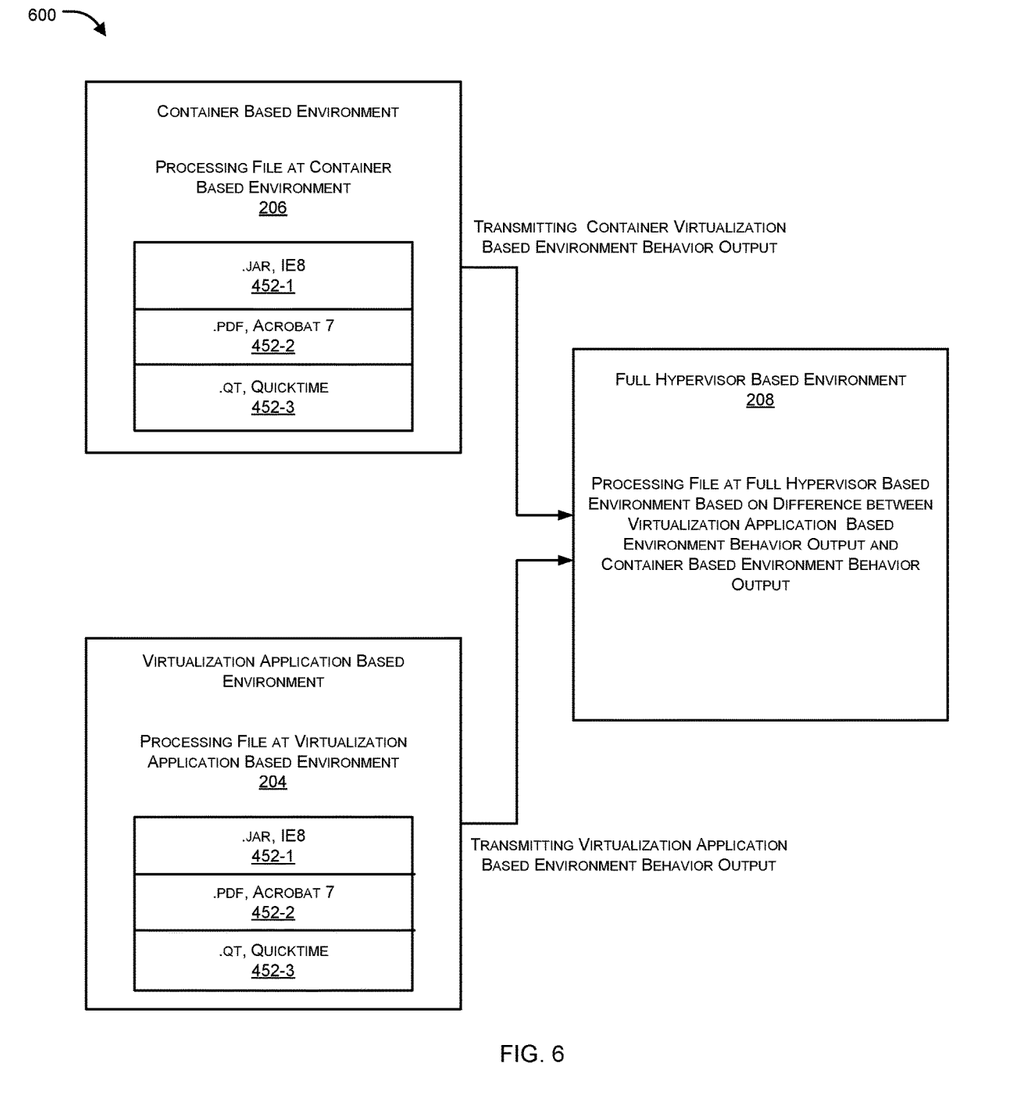
FIG. 6 is a block diagram showing parallel processing of a tagged file by a virtualization application based environment and a container based environment in accordance with an embodiment of the present invention.

FIG. 6 illustrates a block diagram showing parallel processing of a tagged file by a virtualization application based environment and a container based environment. In an embodiment, tagged files .jar file 452-1, .pdf file 452-2, and .qt file 452-3 can be processed at a virtualization application based environment 204 and at a container based environment 206 in order to output first behavior output and second behavior output respectively. In another embodiment, first behavior output and second behavior output can be transmitted to a full hypervisor based environment 208, wherein the first behavior output and the second behavior output can be transmitted based on the difference therebetween.

Figure 7:
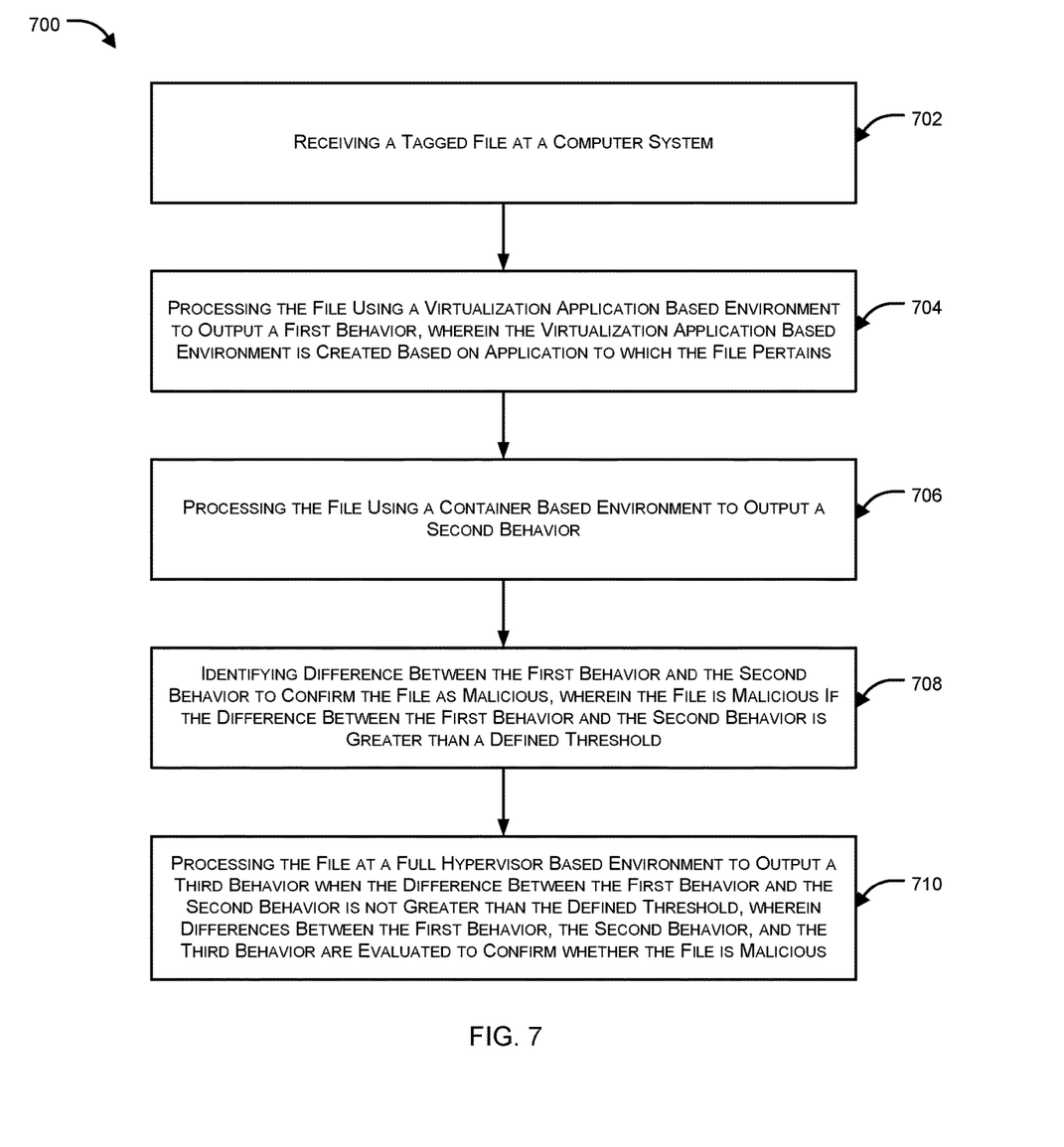
FIG. 7 is a flow diagram illustrating multi-tiered sandbox based network threat detection processing in accordance with an embodiment of the present invention.

FIG. 7 is a flow diagram illustrating multi-tiered sandbox based network threat detection processing in accordance with an embodiment of the present invention. In an aspect, the proposed method can include the steps of, at step (702), receiving a tagged file at a computer system from a NSD, at step (704), processing the tagged file using a virtualization application based environment to output a first behavior, at step (706), processing the tagged file using a container based environment to output a second behavior, and at step (708), identifying difference between the first behavior and the second behavior to confirm the file as malicious, wherein the file is malicious when the difference between the first behavior and the second behavior is greater than a defined threshold, and at step (710), processing the file at a full hypervisor based environment to output a third behavior when the difference between the first behavior and the second behavior is less than or equal to the defined threshold, wherein differences between the first behavior, the second behavior, and the third behavior can be evaluated to confirm whether the file is malicious.

Figure 8:
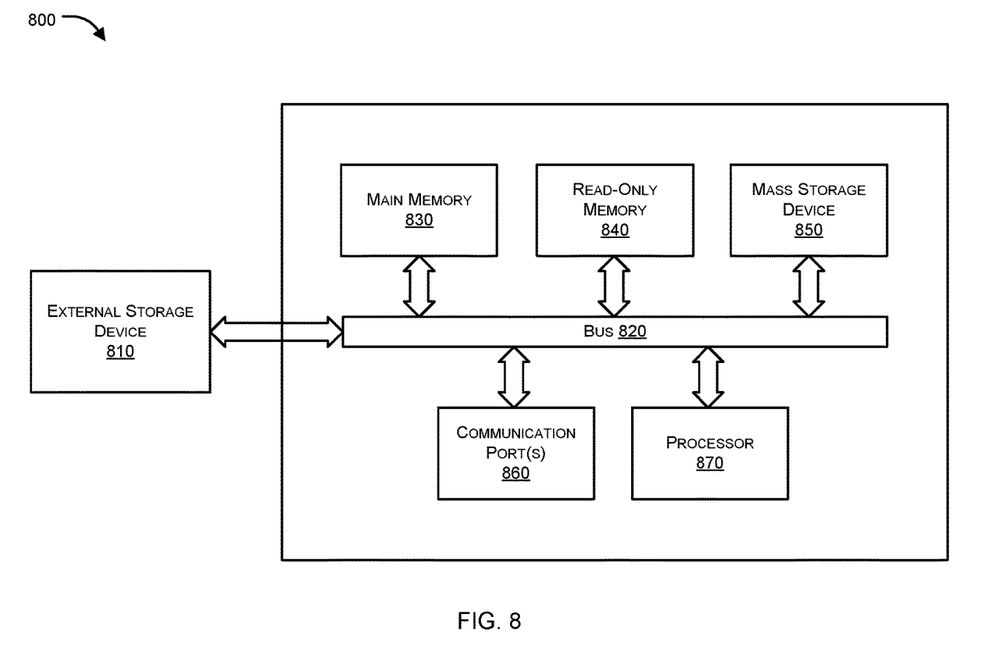
FIG. 8 illustrates an exemplary computer system in which or with which embodiments of the present invention may be utilized in accordance with embodiments of the present disclosure.

FIG. 8 illustrates an exemplary computer system in which or with which embodiments of the present invention may be utilized in accordance with embodiments of the present disclosure.

In an embodiment, virtualization environments can be configured in computer system 800, which represents a server or a network security device implementing a security sandbox, to enable aspects of the present disclosure. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown in the figure, computer system 800 includes an external storage device 810, a bus 820, a main memory 830, a read only memory 840, a mass storage device 850, communication port 860, and a processor 870. A person skilled in the art will appreciate that computer system 800 may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention. Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system 800 connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g., start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system. Optionally, operator and administrative interfaces, e.g. a display, keyboard, and a cursor control device, may also be coupled to bus 820 to support direct operator interaction with computer system 800. Other operator and administrative interfaces can be provided through network connections connected through communication port 860.

External storage device 810 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A non-transitory computer-readable media storing source code that, when executed by a processor, performs a method comprising:
   receiving, by a virtual sandbox appliance, a file that has been tagged by a network security device based on one or more of an application to which the file pertains and a threat-level associated with the file as determined by a pre-filtering process performed on the file by the network security device, wherein a virtual multi-tiered sandbox appliance includes a plurality of virtualization layers each having different resource requirements and wherein the plurality of virtualization layers include:
   a virtualization application based environment, representing a least resource intensive virtualization layer of the plurality of virtualization layers and acting as an intermediary between executable code, an operating system (OS) application programming interface (API), and an instruction set of a particular computer architecture;
   a full hypervisor based environment, representing a most resource intensive virtualization layer of the plurality of virtualization layers; and
   a container-based environment, representing an intermediate resource intensive virtualization layer of the plurality of virtualization layers;
   causing, by the virtual sandbox appliance, the file to exhibit a first set of behaviors by running the file within the virtualization application based environment;
   causing, by the virtual sandbox appliance, the file to exhibit a second set of behaviors by running the file within the container based environment;
   determining, by the virtual sandbox appliance, differences, if any, between the first set of behaviors and the second set of behaviors; and
   classifying, by the virtual sandbox appliance, the file as malicious when the differences are greater than a predefined or configurable threshold.

2. The non-transitory computer-readable media of claim 1, wherein in the method, when the differences are less than or equal to the predefined or configurable threshold, the method further comprises:
   causing, by virtual sandbox appliance, the file to exhibit a third set of behaviors by running the file within the full hypervisor based environment; and
   classifying, by the virtual sandbox appliance, the file as malicious when differences, if any, between any of the first set of behaviors, the second set of behaviors and the third set of behaviors are greater than the predefined or configurable threshold.

3. The method of claim 2, wherein in the method, said running the file within the virtualized application based environment and said running the file within the container based environment are performed in parallel.

4. The non-transitory computer-readable media of claim 3, wherein in the method, the first set of behaviors and the second set of behaviors are provided as an input to the full hypervisor based environment prior to said running the file within the full hypervisor based environment.

5. The non-transitory computer-readable media of claim 1, wherein in the method, the hypervisor based environment employs a first level of entropy generation for creation of the hypervisor based environment that is greater than a second level of entropy generation employed in connection with creation of the container based environment, and wherein the second level of entropy generation is greater than a third level of entropy generation employed in connection with creation of the virtualization application based environment.

6. The non-transitory computer-readable media of claim 1, wherein the method further comprises queuing the file prior to said running the file within the virtualized application based environment and prior to said running the file within the container based environment.

7. The non-transitory computer-readable media of claim 6, wherein in the method, said queuing enables separation of the file from corresponding network security threat data.

8. The non-transitory computer-readable media of claim 1, wherein in the method, the virtualization application based environment and the container based environment use a pointer system through a change root environment rather than using a full operating system.

* * * * *